United States Patent [19]

Skarbo et al.

[11] 4,038,298
[45] July 26, 1977

[54] REMOVING AMMONIA FROM SOLUTIONS OF OXIME-METAL CHELATE

[75] Inventors: Roald R. Skarbo, Lexington; Robert E. Lueders, Needham, both of Mass.; Edmond A. Morin, Aurora; Hal D. Peterson, Boulder, both of Colo.

[73] Assignee: Kennecott Copper Corporation, New York, N.Y.

[21] Appl. No.: 610,935

[22] Filed: Sept. 8, 1975

Related U.S. Application Data

[63] Continuation of Ser. No. 317,003, Dec. 20, 1972, abandoned.

[51] Int. Cl.$^2$ .................. C07F 1/08; C07F 15/04
[52] U.S. Cl. .................. 260/429 J; 260/438.1; 260/439 R; 423/24; 423/139
[58] Field of Search ............. 423/24, 139; 75/101 BE, 75/117, 119; 260/429 J, 438.1, 439 R

[56] References Cited

U.S. PATENT DOCUMENTS

| 3,163,524 | 12/1964 | Weisberg et al. | 75/119 |
| 3,743,585 | 7/1973 | Lowenhaupt et al. | 75/119 |
| 3,853,725 | 12/1974 | Skarbo | 423/24 X |

OTHER PUBLICATIONS

Merigold et al. "LIX 64N-The Recovery of Copper from Ammoniacal Leach Solutions" Solvent Extraction, vol. II, Society of Chemical Industry, London 1971 pp. 1351-1355.

Primary Examiner—O. R. Vertiz
Assistant Examiner—Brian E. Hearn
Attorney, Agent, or Firm—John L. Sniado; Anthony M. Lorusso

[57] ABSTRACT

A process for selectively removing ammonia from an organic solution containing ammonia and an oxime-metal chelate which comprises countercurrently contacting the organic solution with an aqueous solution of ammonium carbonate, ammonium bicarbonate, alkali metal bicarbonate or mixtures thereof. The mole ratio of ammonia, in organic solution prior to contact with the carbonate solution, to carbonate and/or bicarbonate in the fresh aqueous scrub solution is maintained so that ammonia transfer is effected from the organic solution to the aqueous solution. In the fresh scrub solution, the carbonate or bicarbonate concentration is maintained sufficiently high to prevent substantial emulsification of aqueous phase in the organic solution and the ammonia concentration is less than the ammonia concentration in equilibrium with 50 mg/l ammonia in the organic solution. The ammonia-depleted organic solution can be contacted with water or an aqueous solution of sulfuric acid or an aqueous solution of a sulfuric acid-ammonium sulfate mixture to remove additional ammonia prior to recovering metal therefrom.

12 Claims, 4 Drawing Figures

AMMONIA EQUILIBRIUM DIAGRAM FOR 40 VOLUME % LIX-64N WITH ONE MOLAR $NH_4HCO_3$

REMOVING AMMONIA FROM SOLUTIONS OF OXIME-METAL CHELATE

This is a continuation, of application Ser. No. 317,003 Filed Dec. 20, 1972, now abandoned.

BACKGROUND OF THE INVENTION

This invention relates to a process for removing ammonia from organic solutions of an oxime-metal chelate prior to treating the solution to remove the metal therefrom.

In copending applications Ser. No. 266,985 entitled "Selecting Stripping Process", Ser. No. 266,981 entitled "Process for Recovering Nickel Selectively" and Ser. No. 266,986 entitled "Selective Solvent Extraction Process for Copper", all filed June 28, 1972 there are described various processes for recovering nickel or copper from aqueous ammonical solutions. In these processes, an ore containing copper and/or nickel is contacted with an aqueous ammonical solution, generally ammonia-ammonium carbonate having a pH above 9, to form an aqueous solution of these metals. The copper and/or nickel contained in the aqueous metal-rich solution then is chelated with an oxime in a solvent extraction step. The chelate is stripped with an aqueous acid solution to transfer the metal from the oxime to the acid solution and the metal-rich stripping solutions are treated by electrowinning to recover pure nickel and copper.

In one process, separation of nickel and copper is achieved in the solvent extraction step. Copper is selectively extracted from the aqueous solution by effecting copper ion transfrom the aqueous solution to the oxime solution and hydrogen ion transfer from the oxime solution to the aqueous solution in accordance with the equation:

wherein R. is the organic moiety of the oxime and wherein the mole ratio of exchangeable hydrogen ion in the oxme solutionprior to contact with the aqueous solution to copper ion in the aqueous solution prior to contact with the oxime solution is between about 1.8 and 2.4. Thereafter, a copper-barren, nickel-rich aqueous solution recovered from the copper extraction step is contacted with a second organic oxime solution in a second extraction step to effect nickel ion transfer from the aqueous solution to the oxime solution and hydrogen ion transfer from the oxime solution to the aqueous solution. The copper-rich oxime solution and the nickel-rich oxime solution obtained from the extraction steps are treated in separate stripping steps with an acid aqueous solution followed by electrowinning to recover nickel metal and copper metal separately.

In an alternative process, selective separation of nickel and copper is effected in a stripping step following coextraction of nickel and copper from an aqueous ammonical solution with an organic oxime solution. In this process, hydrogen ion in the aqueous solution is exchanged for nickel ion in the oxime selectively. Nickel and hydrogen ion transfer is effected in the nickel stripping step in accordance with the following equation:

wherein the mole ratio of hydrogen ion in the fresh aqueous acid solution to nickel ion in the fresh oxime solution is maintained between about 1.8 and 2.2. A copper-rich oxime solution recovered from this acid nickel stripping step 15 contacted with an aqueous acid solution in a separate copper stripping step wherein the copper ion in the oxime solution and hydrogen ion in the aqueous acid solution are exchanged. The nickel-rich aqueous solution and the copper-rich aqueous rich solution recovered from each of these stripping steps then are treated by electrowinning in separate steps to obtain pure nickel and copper metal separately.

It has been discovered that in each of these processes, some ammonia is transferred from the original ammonical leach solution to the oxime during extraction and essentially all of this ammonia is transferred to the acid aqueous stripping solutions. This transfer results in substantial reagent losses and formation of ammonium salts which must be removed from the process. The formation of the ammonium salts in the stripping step is particularly undesirable in the case of nickel stripping since it results in the precipitation of nickel as $NiSO_4$ $(NK_4)_2SO_4$ when the preferred sulfuric acid stripping solution is employed. Accordingly, to render the processes described in the above identified applications attractive, from a commerical standpoint, it is necessary that the ammonia be removed from the organic oxime solution prior to contact with an aqueous stripping stream in the stripping steps.

Since ammonia is soluble in water and in a wide variety of aqueous salt solutions, it would be expected that ammonia could be scrubbed from the oxime-metal chelate organic solutions by countercurrent contact therewith in a plurality of stages. However, it has been found that scrubbing of ammonia from saturated organic solutions with water and various aqueous salt solutions is impractical because of a low distribution ratio of ammonia between the aqueous and organic phase. Also, when water is contacted with the ammonia containing, oxime-metal chelate, organic solution, an emulsion is often formed which hinders or prevents separation of the aqueous phase from the organic solution thereby causing ammonia to be retained in the organic solution. It is believed that the ammonia forms ammonium hydroxide with the water and that the ammonium hydroxide promotes emulsion formation. Thus, the use of water would require means for breaking the emulsion prior to directing the organic solution to a stripping step.

As used herein, the terms, "first scrubbing stage" or "first stage" refers to the stage in the multi-stage scrubbing process wherein ammonia-rich organic solution first is contacted with an aqueous solution containing carbonate or bicarbonate ion. The terms "last scrubbing stage" or "last stage" refers to the stage in a multi-stage scrubbing process wherein fresh aqueous solution containing carbonate or bicarbonate ion is contacted first with the ammonia-rich organic solution and wherein ammonia-depleted organic solution is removed from the scrubbing process. The remaining stage in the scrubbing process are referred to herein as the "intermediate stages".

SUMMARY OF THE INVENTION

Suprisingly, it has been found that when the ammonia-containing organic solution is contacted with an aqueous solution of ammonium carbonate, ammonium bicarbonate, alkali metal bicarbonate or mixtures thereof, little or no emulsification of the aqueous and organic solutions occurs, substantially all of the ammonia can be transferred from the organic solution to the aqueous solution and no process disadvantages are encountered during the subsequent stripping and electrowinning steps wherein the metal is recovered. In accordance with the present invention, an organic solution containing ammonia and a metal chelate of an oxime is contacted with an aqueous solution of an alkali metal bicarbonate, ammonium carbonate, ammonium bicarbonate or mixtures thereof to selectively remove ammonia and obtain an organic solution containing less than about 50 mg. ammonia per liter. The mole ratio of ammonia in the fresh organic stream to carbonate or bicarbonate in the fresh aqueous stream is maintained so that ammonia transfer is effected from the organic solution to the aqueous solution. In the fresh scrub solution the carbonate or bicarbonate concentration is maintained sufficiently high to prevent substantial emulsification of aqueous phase in the organic solution and the ammonia concentration is less that that which is in equilibrium with 50 mg. per liter ammonia in the organic solution. The metal-rich ammonia-free, organic solution then can be contacted with an aqueous acid solution in a stripping step to remove copper or nickel therefrom. In one aspect of this invention, the organic solution obtained after contact with the carbonate or bicarbonate is contacted with a sulfuric acid aqueous solution or a sulfuric acid-ammonium sulfate aqueous solution maintained at a pH above that wherein metal is stripped from the organic solution or with water to remove additional ammonia to a concentration in the organic solution of less than about 5 mg. per liter of organic solution prior to contact with acid in a stripping step.

DESCRIPTION OF THE SPECIFIC EMBODIMENTS

In order to effect the desired ammonia removal, there is no lower limit on the mole ratio of ammonia in the organic solution to carbonate and/or bicarbonate in the aqueous solution since an increased amount of carbonate or bicarbonate effects increased removal of the ammonia from the organic solution. However, when the carbonate or bicarbonate concentration in the aqueous solution is too low, undesirable emulsification of aqueous phase in the organic solution occurs. When ammonia concentration in the aqueous solution is too high, there will be insufficient ammonia transfer to the aqueous solution to reduce the ammonia concentration in the organic solution to less than 50 mg/l. Suitable ammonia concentration in the aqueous solution can be determined easily from ammonia equilibrium curves in the manner described below. It is preferred to operate at a mole ration of ammonia in the organic solution to carbonate and/or bicarbonate in the aqueous solution such that the volumetric ratio of the organic solution to the aqueous solution is maintained between about 3 and 15 so that the number of scrubbing stages employed is between 1 to 4 provide desirable economic advantages to the process. The particular mole ratios used to require ony 1 to 4 scrubbing stages can be determined for a particular ammonia-containing organic solution from ammonia aqueous-organic solution equilibrium curves described below and in the manner described by McCabe and Smith "Unit Operations of Chemical Engineering," Published 1965, page 598–609. In addition, whem ammonium carbonate and/orr bicarbonate is used as scrub solution, the aqueous solution recovered from the scrub circuit can be recycled and used in a leaching step wherein it is contacted with a nickel and copper-rich ore to leach copper and nickel selectively from the ore. The ammonia-depleted organic stream then is directed from the scrubbing step to a stripping step wherein it is contacted with an aqueous acid solution to selectively recover nickel or copper.

In one embodiment of this invention, the ammonia-depleted organic stream recovered from the scrubbing step is directed to a separate scrubbing stage wherein it is contacted with water an aqueous sulfuric acid solution or an aqueous solution of sulfuric acid and ammonium sulfate prior to being sripped. in this stage, the ammonia concentration in the organic stream can be reduced to less than about 5 mg. per liter. When employing sulfuric acid or slufric acid and ammonium sulfate in this latter stage, the pH of the aqueous solution is maintained above that where nickel or copper ion is stripped from the organic solution into the aqueous solution with the ammonia. Water can be employed to remove ammonia from the organic solution containing less than 50 mg./1 ammonia since the aqueous to organic volume ratios required are far less than would be required with organic solutions containing higher concentration of ammonia, eg./g/1 at the lower aqueous to organic volume ratios, the problem of emulsification can be substantially reduced or eliminated. It is preferred to employ the aqueous sulfuric acid solution or sulfuric acid-ammonium sulfate aqueous solution in this last scrubbing stage rather than water since water tends to form an emulsion with the organic solution containing the oxime while the aqueous sulfuric acid solution does not. When employing water, suitable means can be provided for breaking any emulsion and separating the ammonia-deplected organic stream from the aqueous stream. It has been found that ammonium sulfate at a concentration of about 10 to 100 g/1 with sulfuric acid in aqueous solution greatly improves separation between aqueous and organic.

BRIEF DESCRIPTION OF THE DRAWING

This invention will be more fully described with reference to the accompanying figures.

DETAILED DESCRIPTION OF THE DRAWINGS

Figure 1:
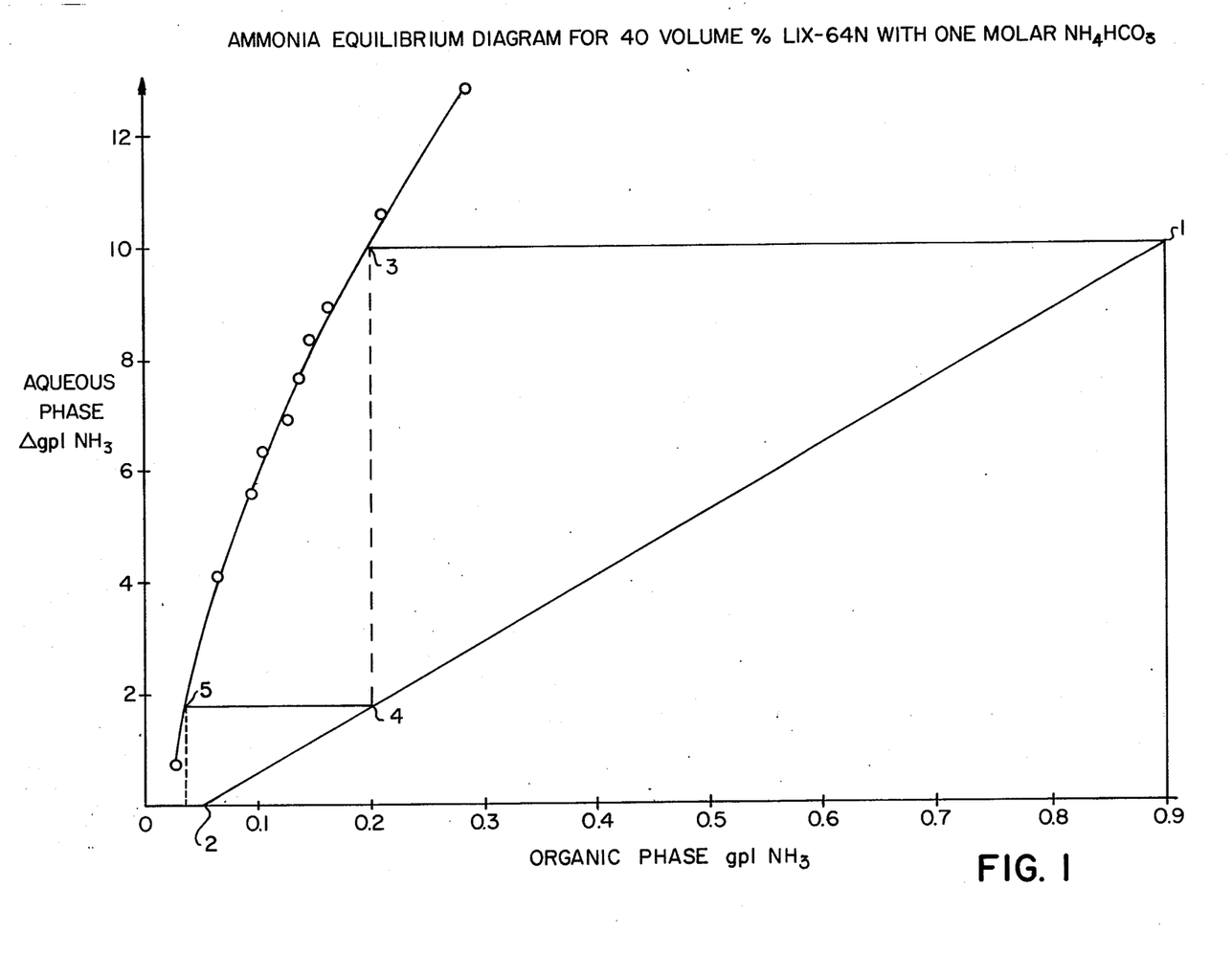
FIG. 1 shows a scrub equilibrium curve for a one molar ammonium bicarbonate solution and an organic solution comprising 40%LIX-64N in kerosene and containing ammonia.

Referring to FIG. 1, the scrub equilibrium curve is obtained by equilibrating a one molar ammonium bicarbonate aqueous solution with a solution of 40% LIX-64N dissolved in kerosene which contain 5.1 grams per liter copper, 4.1 grams per liter nickel, 0.9 grams per liter ammonia. The organic solution is formed by extracting an ammonia-ammonium carbonate leach solution having a pH of 10.1 and containing nickel and copper ion. As shown in FIG. 1, 50 mg. per liter of ammonia in the organic solution is in equilibrium with about 20 grams per liter of ammonia in the aqueous solution. Therefore, the fresh aqueous solution to the scrubbing step should contain less than about 20 grams per liter ammonia.

The operating line is defined by two points. One point is defined by the initial ammonia concentration in the organic solution on a line defining the desired ammonia concentration range in the final aqueous solution. The second point is defined by the desired ammonia concentration in the final organic solution obtained from the scrubbing step. In this case, the operating line is defined by point 1 which is 0.9 grams per liter or ammonia in the organic phase and a change of 10 grams per liter of ammonia in the aqueous phase after contact with the organic solution and point 2 which is 0.5 grams per liter ammonia in the final organic solution. With the increase of 10 grams per liter ammonia in the aqueous solution, the aqueous removed from the last stage of a scrubbing step contains 27 grams per liter ammonia in the solution can be employed to leach nickel and copper from the ore. Point 3 of the equilibrium curve represents the ammonia concentration of both the organic stream after being mixed in the first scrubbing stage and the aqueous stream removed from the first scrubbing stage. Point 4 on the operating line represents the ammonia concentration in the aqueous stream from the second scrubbing stage and the ammonia concentration in the organic stream from the first scrubbing stage. Point 5 on the scrub equilibrium curve represents the ammonia concentration in the organic stream from the second scrubbing stage and the ammonia concentration in the aqueous stream removed from the second scrubbing stage. The organic stream to aqueous stream volumetric ratio is 11.8 to 1 and only two scrubbing stages are needed to reduce the ammonia concentration in the organic stream below 50 mg. per liter.

Figure 2:
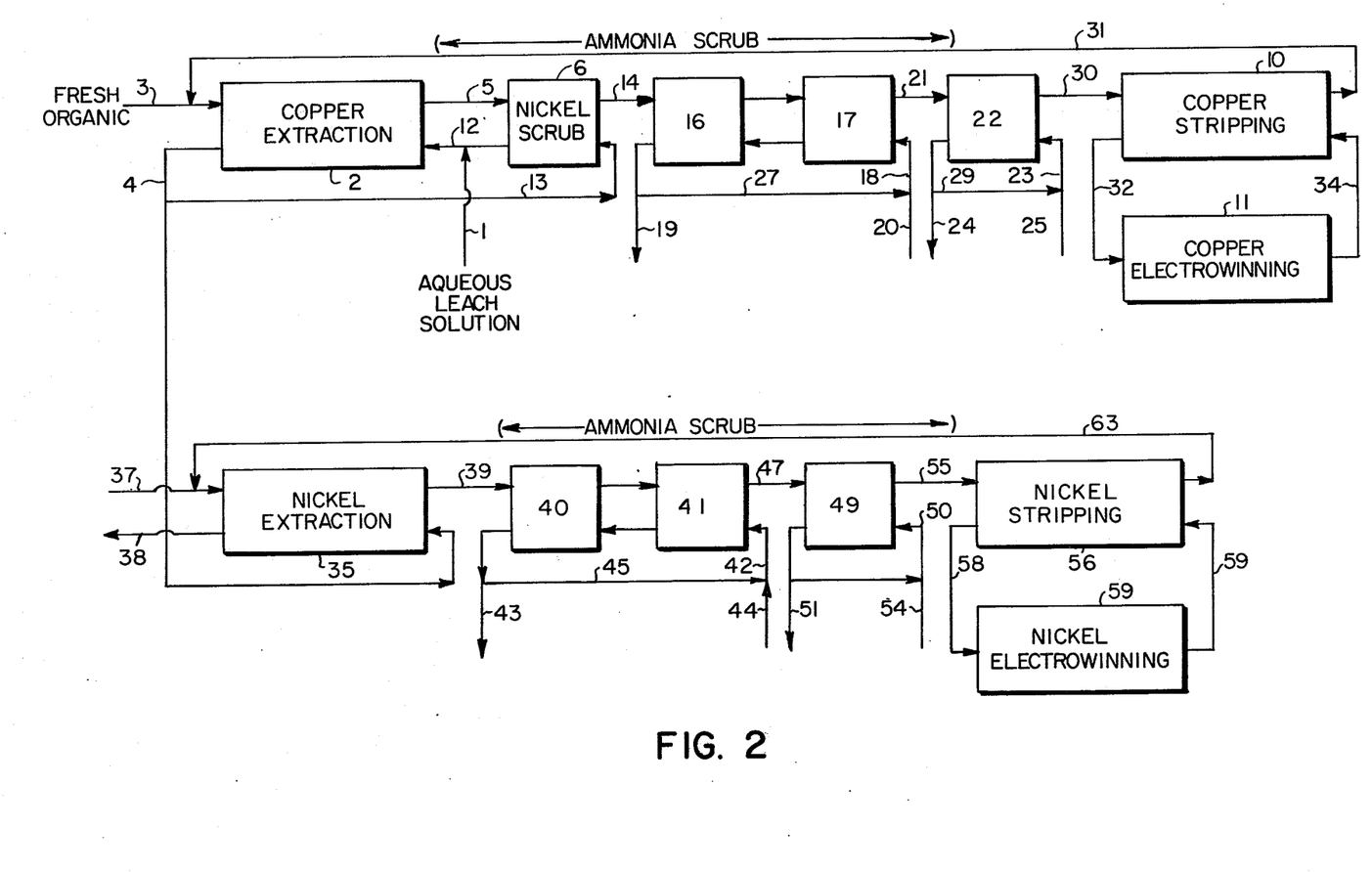
FIG. 2 is a schematic flow diagram of the process of this invention employed with an extraction step wherein copper is extracted selectively.

Referring to FIG. 2, an ammonical leach solution 1 having a pH above about 9 is directed into copper extraction step 2 which comprises a plurality of extraction stages (not shown). A fresh organic stream 3 containing an oxime capable of chelating copper and nickel is introduced into extraction step 2 and is contacted with the aqueous leach solution 1 counter-currently to the flow of the leach solution 1 between the plurality of extraction stages. A nickel-rich aqueous stream 4 is recovered from the copper extraction step 2 and is treated further to recover nickel as described herein after. A copper-rich organic stream 5 is directed to a nickel scrubbing step 6 wherein any residual nickel remaining in the copper-rich organic stream 5 is removed prior to ammonia scrubbing. This procedure improves the copper to nickel ratio in the copper-rich organic stream entering the copper stripping step 10 thereby decreasing the amount of nickel in the copper electrowinning step 11. The stream 12 containing any residual nickel removed from the nickel scrubbing step 6 is reintroduced into copper extraction step 2 with the aqueous leach solution 1. In the nickel scrubbing step 6, the copper-rich organic stream 5 is contacted countercurrently with copper-depleted aqueous leach solution 13. The copper-rich organic stream 14 is directed to an ammonia scrubbing process wheren it is contacted countercurrently in the first two scrubbing stages 16 and 17 with a carbonate or bicarbonate aqueous solution 18. In the case where ammonium bicarbonate is employed as the scrubbing solution, excess ammonia is removed from stages 16 and 17 by providing a bleed stream 19 and bicarbonate make-up is provided in stages 16 and 17 by introducing water and carbon dioxide in stream 20 which is admixed with the stream 18. The ammonia depleted, copper-rich organic solution 21 contains less than about 50 mg. ammonia per liter of solution. Stream 21 is introduced into a final scrubbing stage 22 wherein it is contacted countercurrently with a sulfuric acid aqueous solution 23 which contains ammonium sulfate. Excess ammonia is removed from scrubbing stage 22 by means of stream 24 and make-up sulfuric acid is introduced into stage 22 through streams 25 and 23. The ammonium bicarbonate stream 27 recovered from stage 16 is recycled to stage 17. Similarly, the sulfuric acid stream 29 recovered from stage 22 is recycled to stage 22.

The copper-rich ammonia-depleted organic stream 30 is directed to copper stripping step 10 wherein it is countercurrently contacted in a plurality of stages with an aqueous acid solution such as sulfuric acid under conditions of pH and volumetric ratio of organic stream to aqueous stream to exchange hydrogen ion of the acid with copper ion bound by the oxime molecule and which forms a chelate therewith. A copper-depleted oxime stream 31 is recycled to copper extraction step 2. The copper-rich acid stream 32 then is directed to the copper electrowinning step 11 to recover pure copper therefrom. The copper-depleted acid stream 34 is recycled to the copper stripping step 10.

The nickel-rich aqueous stream 4 is directed to a nickel extraction step 35 wherein it is contacted countercurrently with an organic stream containing an oxime extractant 37 in a plurality of stages. The nickel-depleted aqueous stream 38 then can be recycled to a leach step (not shown) to leach copper and nickel from an ore. The conditions under which an oxime extracts nickel from a high pH aqueous leach solution are known in the art and need not be discussed in detail herein. The nickel-rich orgaic stream 38 is directed to an ammonia scrubbing step wherein it is contacted in the first two stages 40 and 41 counter-currently with an aqueous ammonium bicarbonate solution 42. Excess ammonia is removed from scrubbing stage 40 and 41 by means of a bleed stream 43 and make-up bicarbonate is provided through stream 44 which is admixed with the ammonium bicarbonate stream 45 which is recycled from stage 40 to stage 41. The nickel-rich organic stream 47 contains less than about 50 mg. ammonia per liter of solution. In stage 49, the organic stream 47 is contacted countercurrently with a sulfuric acid solution 50. Excess ammonia from stage 49 is removed by means of bleed stream 51 and make-up sulfuric acid is introduced into stage 49 through stream 54. The nickel-rich organic stream 55 contains less than about 5 mg. ammonia per liter. Stream 55 is contacted in nickel stripping step 56 which an aqueous sulfuric acid solution 57 in a plurality of stages under conditions of pH and volumetric ratio of aqueous streams to organic stream such that hydrogen ion in the aqueous stream is exchanged with substantially all of the nickel ion bound to the oxime molecule in chelate from. Specific stripping conditions for removing nickel from the organic stream are well known in the art and need not be recited herein in detail. The nickel-rich acid stream is directed to a nickel electrowinning step 59 to recover pure nickel. The nickel depleted oxime stream 63 is recycled to extractant step 35.

Figure 3:
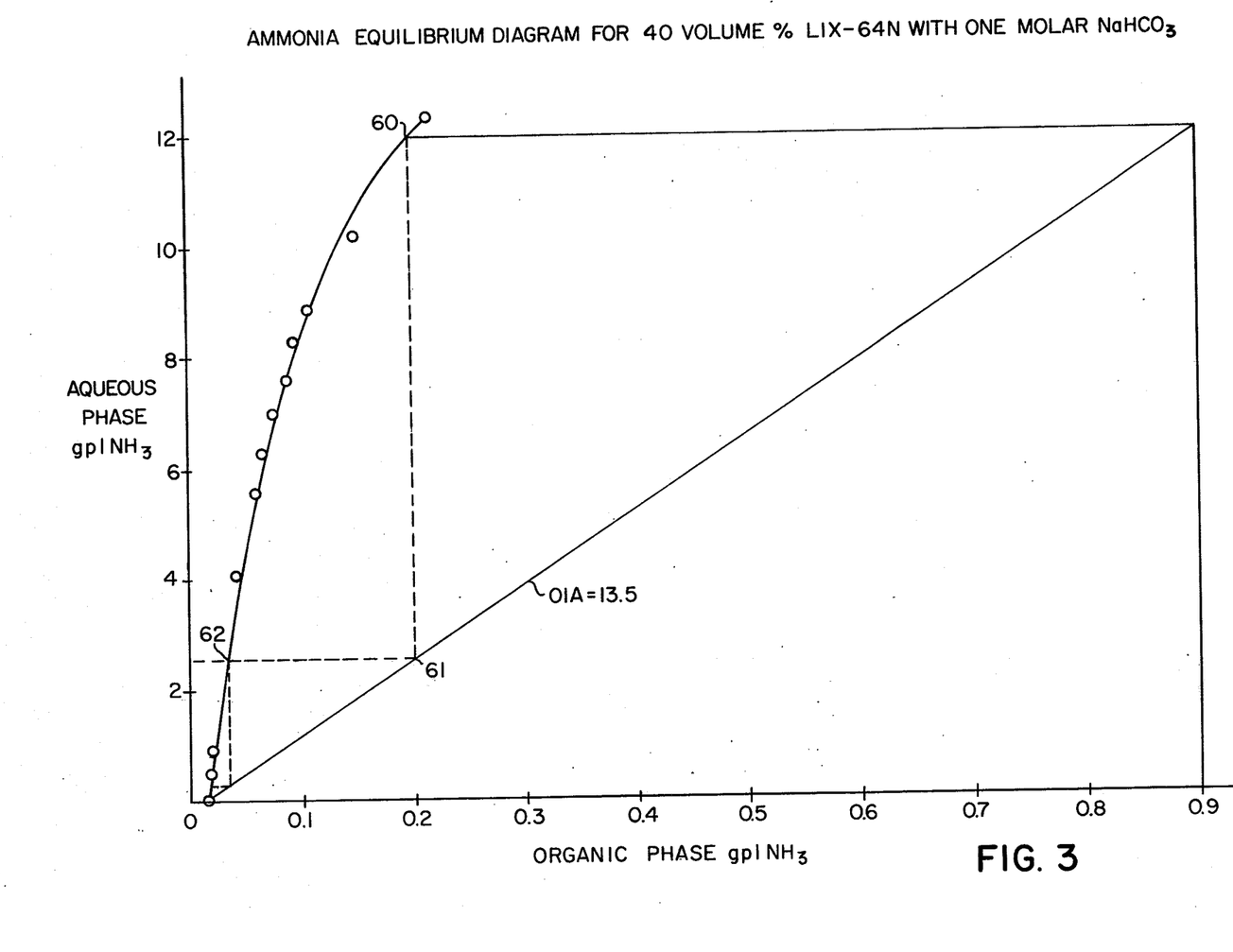
FIG. 3 is a scrub equilibrium curve for a one molar solution of sodium bicarbonate and a kerosene solution of 40% LIX-64N and containing ammonia.

Referring to FIGS. 3, a scrub equilibrium curve is obtained by equilibrating a 1 molar sodium bicarbonate aqueous solution with a solution of 40% LIX-64N dis- solved in kerosene which contains 5.1 grams per liter copper, 4.1 grams per liter nickel and 0.9 gram per liter ammonia. The organic solution was formed by extracting an ammonia-ammonium carbonate leach solution having a pH of 10.1 and containing nickel and copper ion. As shown in FIG. 3, 50 mg. per liter of ammonia in the organic solution is in equilibrium with about 4 grams per liter of ammonia in the aqueous solution. Therefore, the fresh aqueous solution 64 (see FIG. 4) directed to the scrubbing step 66 should contain less than about 4 grams per liter ammonia. The operating line is defined in the manner described above with reference to FIG 1 and, as shown with an organic stream to aqueous stream of voluemetric ratio of 13.5, only two scrubbing stage 66 and 69 are required to reduce the ammonia concentration in the organic solution to below 50 mg. per liter. Point 60 on the equilibrium curve represents the ammonia concentration of both the organic stream 68 after being mixed in the first scrubbing stage 69 and the aqueous stream 70 after being mixed in the first scrubbing stage 69. Point 61 on the operating line represents the ammonia concentration in the aqueous stream 67 from the second scrubbing stage 66 and the ammonia concentration in the organic stream 68 from the first scrubbing stage 69. Point 62 on the scrub equilibrium curve represents the ammonia concentration in the organic stream 65 from the second scrubbing stage 66 and the ammonia concentration in the aqueous stream 67 removed from the second scrubbing stage 66. The organic stream 71 is obtained from extraction step 72 by contacting an ammonical leach solution containing copper and nickel 73 with a 40% solution of LIX-64N and dissolved in kerosene 75. The nickel and copper barren aqueous stream 76 can be employed as a leach solution to extract copper and nickel from ore.

Figure 4:
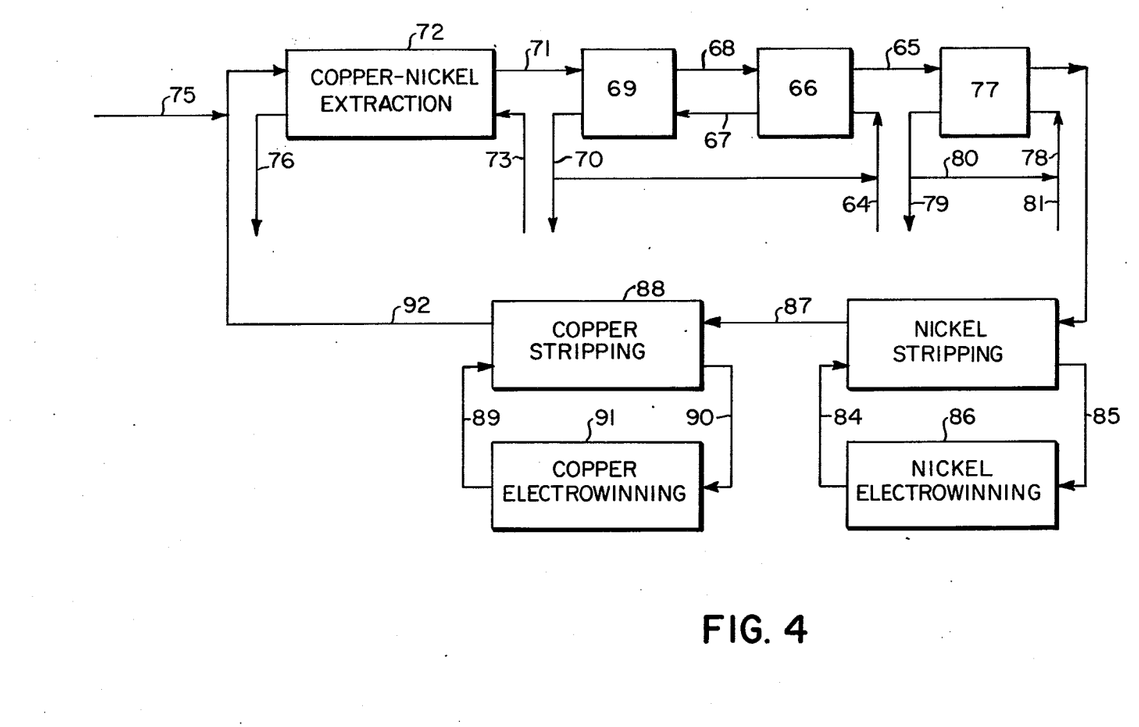
FIG. 4 is a schematic flow diagram showing the process of this invention in use with an extraction step wherein copper and nickel are coextracted.

Stream 65 is directed to an ammonia scrubbing step 77 wherein it is contacted with an aqueous solution of sulfuric acid 78 to remove additional ammonia from the organic stream. A bleed stream 79 is provided to remove ammonia from scrubbing stage 77 and the majority of the sulfuric acid removed from stage 77 is recycled as stream 80 to contact incoming fresh sulfuric acid 81. The ammonia depleted organic stream 82 is directed to a nickel stripping 83 wherein it is contacted with sulfuric acid 84 to selectively remove nickel from the organic stream 82. The conditions under which the selective removal of nickel is attached is described more fully in the above identified application Ser. No. 266,985. The nickel-rich sulfuric acid stream 85 is directed to a nickel electrowinning step 86 wherein pure nickel is recovered. The nickel depleted copper-rich organic stream 87 is directed to a copper stripping step 88 wherein it is contacted countercurrently with an aqueous acid stream 89 to stream copper from the organic stream 87. The copper-rich aqueous stream 90 is directed to a copper electrowinning step 91 to recover pure therefrom. The nickel and copper depleted organic stream 92 is recycled to extraction step 72.

OXIME CHELATING AGENTS

The oximes in solution containing nickel and copper which can be scrubbed in accordance with this invention include α-hydroxy oximes, substituted hydroxy benzophenoximes, and mixtures thereof.

The α-hydroxy oxime component has the general formula where R, R' and " may be any of a variety of organic hydrocarbon radicals such as aliphatic and alkylaryl radicals. R" may also be hydrogen. Perferably, R and R; are unsaturated hydrocarbon or branched chain alkyl, groups, containing from about 6 to 20 carbn atoms, R and R' are also preferably the same and, when alkyl, are preferably attached to the carbons substituted with the —OH and = NON groups through a secondary carbon atom. It is also preferred that R" is hydrogen or unsaturated hydrocarbon or branched chain alkyl groups containing from about 6 to 20 carbon atoms. The -hydroxy oximes also preferably contain a total of about 14 to 40 carbon atoms. Representative compounds are 19-hydroxyhexatriaconta-9, 27-dien-18-oxime, 5-10-dithyl-8-hydroxy-tetradecan-7-oxime, and 5,8-diethyl-7-hydroxy-dodecane-6-oxime. The latter compound has the following structural formula:

Representative of other mono- and polyunsaturated radicals are heptenyl, octenyl, decenyl, octadecenyl, octadecynyl and alkyl substituted radicals such as ethyloctadecenyl. Representative of other mono- and polyalkyl substituted saturated radicals are ethylhexyl, diethylheptyl, butylidecyl, butylhexadecyl, ethylbutyldodecyl, butylcyclohexyl and the like.

The α-hydroxy oxime component is also characterized as having a solubility of at least 2% by weight in the hydrocarbon solvent used to make by organic phase and substantially complete insolublity in water.

The substituted benzohenoximes useful in the present invention have the following formula:

in which R and R'may be individually alike or different and are saturated aliphatic groups, ethylenically unsaturated aliphatic groups or saturated or ethylenically unsaturated aliphatic ether groups (i.e. — OH") and m and n are 0, 1, 2, 3 or 4 with the proviso that m and n are not both 0. The total number of carbon atoms in $R_{II}$ and $R'_n$ is from 3-25. R and R'contain 1 to 25 carbon atoms when saturated aliphatic and 3 to 25 carbon atoms when they are ethylenically unsaturated groups. Preferably, the position ortho to the phenolic OH substituted carbon atom is unsubstituted and also preferably the positions ortho to the oxime carbon atom on the other aromatic nucleus are unsubstituted. Branched chain saturated aliphatic hydrocarbon substituents are preferred. Compounds of the above type include the following:

2-hydroxy3'methyl-5-ethylbenzophenoxime
2-hydroxy-5-(1,1-dimethylpropyl()-benzophenoxime
2-hydroxy-5-(1,1-dimethylethyl)-benzophenoxime
2-hydroxy-5-octylbenzophenoxime
2-hydroxy-5-nonyl -benzophenoxime
2-hydroxy-5-dodecyl-benzophenoxime
2-hydroxy-2',4'-dimethyl-5-octylbenzophenoxime
2-hydroxy-2', 3', 5'-trimethyl-5-octylbenzophenoxime
2-hydroxy-3,5-dinonylbenzophenoxime
2-hydroxy-4'-(1,1-dimethylethyl)-5-(2-pentyl)-benzophenoxime
2-hydroxy-4'-(1,1-dimethylethyl)-5-(2-butyl)-benzophenoxime
2-hydroxy-4l -dodecyloxybenzohenoxime
2-hydroxy-4'(1,1-dimethylethyl)-5-methyl-benzopphenoxime
2-hydroxy-4',5-bis-'(1,1-dimetylethyl)benzophenoxime When the α-hydroxy aliphatic oximes are employed in combination with the 2-hydroxy benzophenoximes, the α-hydroxy aliphatic oxime extractants having the following general formula may be used;

where $R^1$, $R^2$ and $R^3$ may be any of a variety of organic radicals such as aliphatic and alylaryl radicals. $R^3$ may also be hydrogen. Preferably, $R^1$ and $R^2$ are unsaturated hydrocarbon or branched chain alkyl groups containing from about 6 to 20 carbon atoms. $R^1$ and $R^2$ are also preferably the same and when alkyl are preferably attached to the carbons substituted wit the —OH and =NOH groups through a secondary carbon atoms. It is also preferred that $R^3$ is hydrogen on unsaturated hydrocarbon or branched chain alkyl groups containing from about 6 to 20 carbon atoms. The α-hydroxy oximes also preferably contain a total of about 14 to 40 carbon atoms. Representative compounds are 19-hydroxyhexatriaconta-9,27-dien-18-oxime, 5,10-kiethyl-8-hydroxytetradecan-7-oxime, and 5,8-diethyl-7-hydroxydodecane-6-oxime. The latter compound has the following structural formula:

Representative of other mono-and polyunsaturated radicals are heptenyl, octenyl, decenyl, octadecenyl, octadecynyl and alkyl substituted radicals such as ethloctadecenyl. Representative of other mono-and polyalkyl substituted saturated radicals are ethylhexyl, diethylheptyl, butyldecyl, butyl-hexadecyl, ethylbutyldodecyl, butylcyclohexyl and the like. The $R^1$, $R^2$, and $R^3$ groups may contain inert substituents.

The relative amounts of the two extractants in the compositions of the present invention can be varied widely with even minute quantities of the α-hydroxy aliphatic oxime being beneficial. However, it is preferred to employ it in the range of 1 to 100% by weight based on the weight of the 2-hydroxy benzophenoxime, with the best results obtainable in the range of 15–50%.

The amount of the extractants in the organic solvent likewise can vary within considerable limits. In general, however, the concentration of total oxime is in the range 2–25%, based on the weight of the organic extracting solution, preferably in the range of 5–15%.

These and other suitable oximes are disclosed for example by U.S. Pat. Nos. 3,224,873; 3,592,775; 3,655,347; 3,455,680; 3,428,449; 3,276,863; and 3,197,274. The nickel and copper are introduced into the oxime to form a chelate therewith by contacting the oxime with an aqueous leach solution containing copper and nickel. Particularly suitable extractants are 2-hydroxy-4-nonylbenzophenoxime which is a primary extractant in a composition also containing an α-hydroxy oxime sold by General Mills Inc. under the tradename LIX-64N, 5,8-diethyl-7-hydroxy-6-dodecanone oxime which is the primary extractant in a composition sold by General Mills Inc., under the tradename, LIX-63 and 2-hydroxy-4-dodecyl-benzophenoxime which is the primary extractant in a composition also containing an α-hydroxy oxime sold by General Mills, Inc. under the tradename LIX-64.

EXAMPLE I

A two-stage countercurrent mixer-settler circuit was assembled to determine the effectiveness of using $NH_4HCO_3$ for continuous removal of $NH_3$ from Cu-Ni-loaded 40 Vol. % LIX-64N in kerosene. The circuit was operated continuously for about 10 hours under the following experimental conditions:

| | |
|---|---|
| Loaded Organic: | 4.8g/l Cu, 4.6g/l Ni, 1.01g/l $NH_3$ |
| Scrubbing solution: | One molar $NH_4HCO_3$ |
| Organic flow rate: | 65 ml/min |
| Aqueous flow rate: | 6.5 ml/min |
| External O/A volume ratio: | 10 |
| Aqueous recycle rate: | 25 ml/min |
| Contact time: | 2 min. |
| Temperature: | 41° C. |

After operating the circuit for 3 hours and 10 min., the aqueous and organic streams leaving the first and second scrub stage, respectively, were sampled. Additional samples were taken with 1 hour intervals until the experiment was terminated. All samples were then analyzed and found to contain the following amounts of $NH_3$:

TABLE I

| Time from start of experiment | $NH_3$ in scrubbed Organic | $NH_3$ in scrub Solution |
|---|---|---|
| (hrs) - (min) | (g/l) | (g/l) |
| Organic Feed | 1.01 | — |
| Aqueous Feed | — | 17.0 |
| 3 - 10 | 0.038 | 25.3 |
| 4 - 10 | 0.040 | 26.0 |
| 5 - 10 | 0.035 | 26.6 |
| 6 - 10 | 0.043 | 26.3 |
| 7 - 10 | 0.042 | 26.6 |
| 8 - 10 | 0.046 | 25.8 |
| 9 - 10 | 0.046 | 26.6 |
| 10 - 10 | 0.045 | 23.4 |

After terminating the experiment, organic and aqueous samples were taken from each of the two settler compartments of the circuit. The indicated samples were analyzed for $NH_3$ and the percentage of $NH_3$ removed from the organic after each scrub stage was calculated. In addition, the aqueous samples were analyzed for Cu and Ni. The results are given in the following table.

TABLE II

| | Aqueous Phase (g/l) | | | Organic Phase | %NH₃ Scrub- |
|---|---|---|---|---|---|
| | NH₃ | Cu | Ni | NH₃ | lative |
| Scrub Stage No. 1 | 26.1 | 0.001 | 0.014 | 0.188 | 81.4 |
| Scrub Stage No. 2 | 18.1 | 0.0003 | 0.0015 | 0.046 | 95.4 |

The experimental results of this example demonstrate that $NH_3$ can be removed continuously and recovered from Cu-Ni-loaded LIX-64N by scrubbing the organic with a solution of $NH_4NHC_3$. The scrubbing method of this example results in no significant loss of Cu and Ni to the aqueous scrub solution.

EXAMPLE II

The countercurrent multistage extraction circuit used in the experiment of this example consisted of four extraction and two $NH_3$ scrubbing stages. The $NH_3$ scrubbing stages had calibrated flowmeters in recycle lines to regulate the flow of calibrated flowmeters in recycle lines to regulate the flow of aqeuous solution. An immersion heater was installed in the last scrub stage to maintain a temperature of about 45° C. The organic used was 20 volume % LIX-64N in kerosene. The aqueous feed (leach solution) analyzed 8.0 g Cu, 5.46 g Ni, 62.8 g $NH_3$, and 55.5 g $CO_2$ per liter. A solution containing 25 grams per liter of $(NH_4)_2 CO_3$ was used as scrub solution. The circuit was operated continuously under the following conditions:

| | |
|---|---|
| Organic flow rate: | 58 ml/min. |
| Leach solution flow rate: | 46 ml/min. |
| O/A Volume Ratio: | 1.26 |
| Scrub solution flow rate: | 6.0 ml/min. |
| O/A volume Ratio: | 9.7 |
| Scrub solution recycle rate: | 20-25 ml/min. |
| Contact time: | 2 min. |

After the extraction and scrubbing stages had reached equilibrium, organic and aqueous samples from each of the two settler compartments of the scrub circuit were taken. In addition, the Cu-Ni-loaded organic entering the scrubbing circuit was sampled. The samples were analyzed as required in order to determine the scrubbing efficiency of the latter circuit. The analytical results are given in the following table.

TABLE II

| | Aqueous Phase (g/l) | | | Organic Phase (g/l) | | | %NH₃ Scrubbed (Cumulative) |
|---|---|---|---|---|---|---|---|
| | NH₃ | Cu (free) | Ni | NH₃ | Cu | Ni | |
| Organic feed | — | — | — | 0.22 | 6.36 | 0.023 | — |
| Scrub Stage No. 1 | 3.86 | 0.003 | 0.003 | 0.04 | 6.36 | 0.023 | 81.8 |
| Scrub Stage No. 2 | 0.38 | 0.001 | 0.001 | 0.02 | 6.36 | 0.023 | 90.8 |

The results of this example show that a solution of $(NH_4)_2 CO_3$ can be used effectively for scrubbing of $NH_3$ from metal-loaded LIX-64N without any loss of metal values to the aqueous scrub location.

EXAMPLE III

A multistage countercurrent mixer-settler cirucit was assembled to consist of 4 extraction and 2 $NH_3$ scrubbing stages. An immersion heater was installed in the last scrub stage to maintain a temperature of about 45° C. The organic used was 20 volume % LIX-64N in kerosene. The ammoniacal feed solution contained 5.50g Ni and 0.04 g Cu per liter. A solution containing 25 grams $(NH_4)_2 CO_3$ per liter was used as feed to the scrubbing circuit. After assembly, the extraction and scrubbing circuits wer operated continuously under the following experimental conditions:

| | |
|---|---|
| Organic flow rate: | 60 ml/min. |
| Nickel solution flow rate: | 37 ml/min. |
| Organic/aqueous volume ratio: | 1.62 |
| Scrub solution flow rate: | 13.5 ml/min. |
| Scrub organic/aqueous volume ratio: | 4.4 |

After the extraction and scrubbing circuits had reached equilibrium, organic and aqueous samples from each of the two settler compartments of the scrub circuit were taken. In addition, the metal-loaded organic entering the latter circuit was sampled. The samples were analyzed as required in order to determine the achieved scrubbing efficiency. The analytical results are given in the following table.

TABLE IV

| | Aqueous Phase (g/l) | | | Organic Phase (g/l) | | | %NH₃ Scrubbed (Cumulative) |
|---|---|---|---|---|---|---|---|
| | NH₃ | Cu (free) | Ni | NH₃ | Cu | Ni | |
| Organic feed | — | — | — | 0.95 | 0.11 | 3.40 | — |
| Scrub Stage No. 1 | 3.88 | trace | 0.002 | 0.14 | 0.11 | 3.40 | 85.3 |
| Scrub Stage No. 2 | 0.32 | nil | 0.001 | 0.068 | 0.11 | 3.40 | 92.8 |

EXAMPLE IV

A copper and nickel loaded 40%, LIX-64N solution in kerosene was scrubbed in two-stages with $NH_4HCO_3$ followed by one stage with $H_2SO_4$. In the first two-stages a one molar solution of $NH_4HCO_3$, at an O/A ratio of 10, was employed to remove about 95% $NH_3$ from LIX-641 N containing about one gram $NH_3$ per liter. In evaluating the use of $NH_4HCO_3$ as acrub solution, the circuit was operated continuously for more than 10 hours under the following conditions:

| | |
|---|---|
| Organic feed: | 40 volume % LIX-64N; 4.83 g/l Cu, 4.56 g/l Ni, 1.01 g/l NH₃ |
| Aqueous Feed: | One molar NH₄HCO₃ solution |
| Number of Stages: | 2 |
| Organic Flow Rate: | 65 ml/min. |
| Aqueous Flow Rate: | 6.5 ml/min. |
| O/A Ratio: | 10 |
| Aqueous Recycle Rate: | 25-30 ml/min. |
| Contact time: | 2 min. |
| Temperature: | 41 ± 1° C. |

After 3 hours of operation, and every subsequent hour, the aqueous and organic streams leaving the first and second scrub stage, respectively, were samples and analyzed for $NH_3$. The results of the indicated analyses are given in Table V.

At the end of the experiment, $NH_3$ analyses were also obtained for aqueous and organic samples taken from each stage of the circuit. The aqueous samples were also analyzed for Cu and Ni. Analytical profile data of the scrub circuit are given in Table VI. The results show that the $NH_4HCO_3$ scrub method reduces the $NH_3$ content of the organic to less than 50 mg/1. Insignificant amounts of Cu and Ni are lost to the aqueous scrub solution.

TABLE V

Hourly Data from Primary Scrub Circuit

| Time Operated (hours) | $NH_3$ in Scrubbed Organic (g/l) | $NH_3$ in Scrub Solution (g/l) |
|---|---|---|
| 3 | 0.038 | 25.3 |
| 4 | 0.040 | 26.0 |
| 5 | 0.035 | 26.6 |
| 6 | 0.043 | 26.3 |
| 7 | 0.042 | 26.6 |
| 8 | 0.046 | 25.8 |
| 9 | 0.046 | 26.6 |
| 10 | 0.045 | — |
| Feed-Organic | 1.01 | — |
| Feed-Scrub Solution | — | 17.0 |

TABLE VI

Analytical Profile Data of Primary Scrub Circuit

|  | Aqueous Phase (g/l) | | | Organic Phase (g/l) $NH_3$ | %$NH_3$ Scrubbed |
|---|---|---|---|---|---|
|  | $NH_3$ | Cu | Ni | | |
| Scrub Stage No. 1 | 26.1 | 0.001 | 0.014 | 0.188 | 81.4 |
| Scrub Stage No. 2 | 18.1 | 0.0003 | 0.0015 | 0.046 | 95.4 |
| Feed-Organic | — | — | — | 1.01 | — |
| Feed-Scrub Solution | 17.0 | — | — | — | — |

The scrubbed organic solution obtained from the first two-stages was contacted with $(NH_4)_2SO_4$ to determine the effect of pH on the scrub efficiency. pH was varied by sulfuric acid addition to the aqueous solution. These tests were carried out in separatory funnels under the following conditions:

| Organic: | 40 Volume % LIX-64N, 4.83 g/l cu, 4.56 g/l Ni, 0.04 g/l $NH_3$ |
|---|---|
| Scrub Solution: | 100 g/l $(NH_4)_2SO_4$ - variable pH |
| O/A Volume Ratio: | 1.0 |
| Contact Time: | 2 min. |
| No. of Contacts: | 1 |
| Temperature: | Ambient |

After separation of the phases, the organic was centrifuged at about 1300 × G to remove entrained $(NH_4)_2SO_4$ and the results are set forth in Table VII.

TABLE VII

Results of $NH_3$ Scrub Tests
[100 g/l $(NH_4)_2SO_4$ - variable pH]

| Start pH | Equilibrium pH | Ni in Aqueous Phase | $NH_3$ in Organic Phase (mg/l) |
|---|---|---|---|
| 3.0 | 3.65 | 126 | 1.5 ± 0.4 |
| 3.5 | 4.65 | 10 | 0.3 ± 0.4 |
| 4.0 | 6.63 | nil | 2.5 ± 0.4 |
| 5.0 | 6.85 | nil | 3.6 ± 0.4 |
| 5.5 | 6.87 | nil | 3.2 ± 0.4 |

Two continuous experiments then were carried out. In the first experiment, 100 g/1 $(NH_4)_2SO_4$, adjusted to pH 3.0, was used as scrub solution. Other conditions were:

| Organic Feed: | 40 volume % LIX-64N, 4.83 g/l Cu, 4.56 g/l Ni, 0.04 g/l $NH_3$ |
|---|---|
| Organic Flow Rate: | 50 ml/min. |
| Aqueous Flow Rate: | 50 ml/min. |
| O/A Volume Ratio: | 1 |
| Number of Stages: | 1 |
| Contact Time: | 2 min. |
| Temperature: | 40° C. |

After the mixer-settler cell had been operated for one hour, samples of the organic and aqueous effluents were collected. Additional samples were taken at hourly intervals. The organic samples were centrifuged at about 1300 × G and subsequently analyzed for $NH_3$. The aqueous samples were analyzed for Cu and Ni. The results are summarized in Table VIII.

TABLE VIII

Hourly Data from Continuous Scrub Experiment
[100 g/l $(NH_4)_2SO_4$ - pH3.0]

| Time Operated (Hours) | Aqueous Phase | | | Organic Phase (Centrifuging- 1300 × G) $NH_3$(mg/l) |
|---|---|---|---|---|
|  | pH | Cu(mg/l) | Ni(mg/l) | |
| 1 | 7.35 | 0.5 | 71.8 | 3.2 ± 0.4 |
| 2 | 4.25 | 0.5 | 89.0 | 2.6 ± 0.4 |
| 3 | 3.65 | 0.5 | 91.8 | 1.5 ± 0.4 |
| 4 | 3.70 | 0.5 | 93.6 | 1.0 ± 0.4 |
| 5 | 3.65 | 0.5 | 82.1 | 0.8 ± 0.4 |

The second continuous scrub experiment was similar to the first, except that the pH of the scrub solution was adjusted to 4.0, and a somewhat different sampling procedure was employed. Organic and aqueous effluent samples were collected after one hour of operation, additional samples being taken every 30 minutes. A portion of each organic sample was immediately stripped with acid in order to determine the amount of ammonia present in the scrubbed organic prior to settling or centrifuging. The experimental results are summarized in Table IX.

TABLE IX

Experimental Data from Continuous Scrub Experiment
[100 g/l $(NH_4)_2SO_4$ - pH4.0]

| Time Operated (Hours) | Aqueous Phase | | $NH_3$ in Scrubbed Organic (mg/l) | |
|---|---|---|---|---|
|  | pH | Ni (mg/l) | Untreated Org. | Centrifuged 1300 x G |
| 1 | 6.85 | 0.5 | 6.3 ± 0.4 | 2.7 ± 0.4 |
| 1.5 | 6.90 | 0.5 | 6.1 ± 0.4 | 2.8 ± 0.4 |
| 2 | 6.90 | 0.6 | 6.8 ± 0.4 | 3.7 ± 0.4 |
| 2.5 | 6.90 | 0.6 | 5.5 ± 0.4 | 3.5 ± 0.4 |
| 3 | 6.85 | 0.5 | 6.1 ± 0.4 | 4.0 ± 0.4 |
| 3.5 | 6.90 | 0.5 | 5.5 ± 0.4 | 3.2 ± 0.4 |
| 4 | 6.95 | 0.5 | 6.4 ± 0.4 | 3.1 ± 0.4 |
| 4.5 | 6.85 | 0.5 | 6.4 ± 0.4 | 3.2 ± 0.4 |
| Average of Last 6 samples |  |  | 6.1 ± 0.4 | 3.5 ± 0.4 |

The results of these experiments show that $NH_3$ can be removed from LIX-64N to less than 50 mg/1 by two-stage counter-current scrubbing with a one molar solution of $NH_4HCO_3$. Further removal of $NH_3$ to about 3 mg/1, with no significant losses of Cu and Ni, can be achieved by subjecting the organic to a final one-stage scrub treatment with a 100 g/1 $(NH_4)_2SO_4/H_2SO_4$ scrub system provides very clean phase separation.

We claim:

1. A process for selectively removing ammonia from an organic oxime extractant chelated with a metal and containing ammonia comprising, countercurrently contacting the organic extractant with an aqueous solution containing a bicarbonmate selected from the group consisting of, ammonium bicarbonate, alkali metal bicarbonates and mixtures thereof to effect ammonia transfer from the organic extractant to said aqueous solution and separating the organic extractant from said aqueous solution.

2. The process as set forth in claim 1 wherein ammonia is removed from an oxime extractant chelated with nickel.

3. The process as set forth in claim 1 wherein ammonia is removed from an oxime extractant chelated with copper.

4. The process as set forth in claim 1 wherein ammonia is removed from oxime extractant chelated with nickel and copper.

5. The process as set forth in claim 2 wherein the bicarbonate that contacts the extractant is ammonium bicarbonate.

6. The process as set forth in claim 3 wherein the bicarbonate that contacts the extractant is ammonium bicarbonate.

7. The process as set forth in claim 4 wherein the bicarbonate that contacts the extractant is ammonium bicarbonate.

8. The process as set forth in claim 2 wherein the oxime extractant from which ammonia is removed is 2-hydroxy-4-nonyl-benzophenoxime.

9. The process as set forth in claim 3 wherein the oxime extractant from which ammonia is removed is 2-hydroxy-4-nonyl-benzophenoxime.

10. The process as set forth in claim 4 wherein the oxime extractant from which ammonia is removed is 2-hydroxy-4-nonyl-benzophenoxime.

11. The process as set forth in claim 1 wherein the bicarbonate that contacts the extractant is ammonium bicarbonate.

12. The process as set forth in claim 1 wherein the bicarbonate that contacts the extractant is sodium bicarbonate.

* * * * *